(12) United States Patent
Goto (10) Patent No.: US 6,850,781 B2
(45) Date of Patent: Feb. 1, 2005

(54) MOBILE COMMUNICATION TERMINAL AND INFORMATION DISPLAY METHOD THEREOF

(75) Inventor: Hiroyuki Goto, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 614 days.

(21) Appl. No.: 09/800,897

(22) Filed: Mar. 8, 2001

(65) Prior Publication Data

US 2001/0034251 A1 Oct. 25, 2001

(30) Foreign Application Priority Data

Mar. 9, 2000 (JP) .................................. P. 2000-064757

(51) Int. Cl.[7] ................................................ H04B 1/00
(52) U.S. Cl. ........................................ 455/566; 345/864
(58) Field of Search ............................... 455/566, 567, 455/550.1, 421, 473, 474, 573, 574; 345/864

(56) References Cited

U.S. PATENT DOCUMENTS

| | | | | |
|---|---|---|---|---|
| 4,975,694 A | * | 12/1990 | McLaughlin et al. | 340/7.55 |
| 6,047,197 A | * | 4/2000 | Jarrad | 455/566 |
| 6,211,858 B1 | * | 4/2001 | Moon et al. | 345/771 |
| 6,285,364 B1 | * | 9/2001 | Giordano et al. | 345/804 |
| 6,330,461 B1 | * | 12/2001 | Andersson | 455/566 |
| 6,377,821 B2 | * | 4/2002 | Forlenzo et al. | 455/566 |
| 6,385,466 B1 | * | 5/2002 | Hirai et al. | 455/566 |
| 6,438,390 B1 | * | 8/2002 | Awan | 455/566 |

* cited by examiner

*Primary Examiner*—Nick Corsaro
(74) *Attorney, Agent, or Firm*—Finnegan, Henderson, Farabow, Garrett & Dunner, L.L.P.

(57) ABSTRACT

A first information indication is removed from a display screen of a liquid crystal display device, when a screen size display mode is switched into a full-screen display mode where only second information is displayed on the display screen. When a notification mode for notifying the first information by using a notification unit is selected/set by operating a key unit, this first information is notified by employing a light-emitting diode for notifying a message reception, an LCD back light, a KEY back light; or a vibrator.

20 Claims, 7 Drawing Sheets

| ELECTRIC FIELD STRENGTH | BATTERY ENERGY REMAINING AMOUNT | LED TURN-ON STATE |
|---|---|---|
| HIGH OR MEDIUM | LARGE | SLOW FLICKERING BLUE |
| HIGH OR MEDIUM | MEDIUM | MEDIUM FLICKERING BLUE |
| HIGH OR MEDIUM | SMALL | HIGH FLICKERING BLUE |
| LOW OR VERY LOW | LARGE | SLOW FLICKERING ORANGE |
| LOW OR VERY LOW | MEDIUM | MEDIUM FLICKERING ORANGE |
| LOW OR VERY LOW | SMALL | HIGH FLICKERING ORANGE |
| OUT OF RANGE | LARGE | SLOW FLICKERING RED |
| OUT OF RANGE | MEDIUM | MEDIUM FLICKERING RED |
| OUT OF RANGE | SMALL | HIGH FLICKERING RED |

MOBILE COMMUNICATION TERMINAL AND INFORMATION DISPLAY METHOD THEREOF

BACKGROUND OF THE INVENTION

1. Field of the Invention

The present invention relates to a mobile communication terminal having a display device, and an information display method of the mobile communication terminal, in particular, to a mobile communication terminal and an information display method thereof, which are capable of switching between a first display mode and a second display mode. In the first display mode, both first information and second information are displayed by dividing a display screen of a display device. In the second display mode, only the second information is displayed on an entire display screen of the display device.

2. Description of the Related Art

Very recently, various functions have become available in mobile communication terminals, such as portable wireless telephones and PHS (Personal Handyphone System). As a result of these various functions, a total amount of information to be displayed on a display device is increased, and therefore, a large-sized display screen of the display device is necessarily required.

However, in this sort of mobile communication terminal, the mobile communication terminal has to be necessarily made compact so as to maintain the portability thereof. Accordingly, the mobile communication terminal has a certain limitation in size when the display screen size of the display device is increased.

In this sort of mobile communication terminal, various conditions of the mobile communication terminal have to be displayed so as to secure the communication reliability. That is, the mobile communication terminal should display the setting conditions of the mobile communication terminal, an electric field strength (e.g., an RF signal strength), and a battery energy remaining amount.

As a consequence, in the conventional mobile communication terminal, the display screen of the display device is divided into two display areas. One of the two display areas displays the setting information, the electric field strength, and the battery energy remaining amount of the mobile communication terminal. The other of the display areas displays such information as a telephone number, a character message, and an illustration figure, which are selected by the user operation.

However, when a total amount of user-selected information, such as the above-described telephone number, character message, and illustration figure, to be displayed on the display device is increased, the user-selected information cannot be satisfactorily displayed on the divided display area. Taking these problems into consideration, a so-called "full-screen display function" has been proposed. In the full-screen display function, the indications related to the setting information, the electric field strength, and the battery energy remaining amount are removed from the display screen, and then, several pieces of these information indications may be switchingly displayed on the full-screen of the display device.

However, when the above-explained full-screen display function is employed, the following problem occurs. That is, under such a condition that the display mode is switched to the full-screen display function, the user cannot grasp the setting information, the electric field strength, and the battery energy remaining amount. More specifically, if the user cannot precisely acquire such information as the electric field strength and the battery energy remaining amount, which is periodically changed depending upon the latitude positions and the communication condition of the mobile communication terminal, then not only the communications are brought into troubled conditions, but also the communications are suddenly interrupted.

SUMMARY OF THE INVENTION

An object of the present invention is to provide a mobile communication terminal capable of notifying necessary information even under a condition that the display mode is switched to the so-called "full-screen display mode."

Another object of the present invention is to provide a mobile communication terminal capable of improving communication reliability and communication operability, while necessary information can be notified even under a full-screen display mode.

Still another object of the present invention is to provide an information display method of a mobile communication terminal having a superior information notification function, while necessary information can be notified even under a full-screen display mode.

A mobile communication terminal, according to an aspect of the present invention, comprises first information indicative of a condition of the mobile communication terminal, and also second information containing at least one of character information and image information are displayed on a display in a first display mode; the second information is displayed on the display in a full screen size in a second display mode; and the mobile communication terminal comprises a notification control unit for notifying the first information by employing a notification unit when the present display mode is switched to the second display mode.

In this case, the above-described first information corresponds to information-amount fixed information indicative of a predetermined apparatus condition which contains, for instance, at least one of an electric field strength and a battery energy remaining amount. The above-described second information corresponds to information-amount variable information containing, for example, at least one of a telephone number, a character message, and an illustration figure. This information-amount variable information is displayed on a display screen of a display device in order to be confirmed by a user.

Specifically, the first information contains so-called "pictorial indications" such as an antenna figure indication showing an electric field strength, and a battery figure indication indicating a battery energy remaining amount.

Also, the second information contains various sorts of information indications acquired via a communication network, a telephone number indication, and a transmission/reception mail indication. Not only character information, but also illustration figure information are contained in the second information.

The notification unit for notifying the first information by the notification control unit, when the present display mode is switched to the second display mode, may be a well-known visual notification unit, acoustic notification unit, or tactile notification unit. Or such a notification unit newly employed so as to realize the function of the present invention may be utilized, for instance, 1) a light-emitting diode for notifying a message reception;

2) a back light of a display device;

3) a back light of an operation key;

4) a vibrator for notifying a message reception; and 5) either a light-emitting diode or another notification unit, which are exclusively provided so as to realize the function.

In this case, when "a light-emitting diode for notifying a message reception" is employed as the notification unit, the first information may be notified based upon a turn-ON mode of "a light-emitting diode for notifying a message reception", for example, either a turn-ON color or a turn-ON period. Alternatively, the first information may be notified by combining at least two sets of a turn-ON pattern, a turn-ON color, and a turn-ON period of the "light-emitting diode for notifying the message reception."

Also, in such a case that either "a back light of a display device" or "a back light of an operation key" is employed as the notification unit, the first information may be notified based upon a turn-ON mode of "a back light of a display device", or a turn-ON mode of "a back light of an operation key", for example, a turn-ON color thereof.

In the case that "a vibrator for notifying a message reception" is employed as the notification unit, the first information may be notified based upon a vibration mode of the "vibrator for notifying a message reception", for example, a vibration period, and a vibration pattern thereof.

In this case, as the first information, for instance, only one sort of electric field strength may be employed. Also, more than two sorts of first information such as an electric field strength and a battery energy remaining amount may be employed. Alternatively, plural sorts of first information may be notified by a single set of the notification unit by combining the display modes of the notification unit.

Furthermore, while a plurality of notification units are employed as the notification unit, the first information may be notified by combining the notification modes of the plurality of notification units.

The mobile communication terminal, according to the present invention, is characterized in that the notification control unit comprises a setting section for selectively setting a notification mode in which the first information is notified. When the notification mode is set by the setting mode, the notification control unit notifies said first information by employing the notification unit under such a condition that the present display mode is switched to the second display mode.

Also, the mobile communication terminal, according to the present invention, is characterized in that the setting section sets the notification mode under an idle state; and the notification control unit notifies the first information by employing the notification unit in the case that the present display mode is switched to the second display mode.

Furthermore, the mobile communication terminal, according to the present invention, is characterized in that the setting section sets the notification mode when the present display mode is switched to the second display mode, and notifies the first information in response to the notification mode set by the setting section.

Moreover, the mobile communication terminal, according to the present invention, is characterized in that the notification control unit comprises a judging section for judging whether the present state corresponds to an idle state or a telephone communication state. When the judging section judges that the present state corresponds to the telephone communication state, the notification control unit notifies the first information by employing the notification unit in the case that the present display mode is switched to the second display mode.

Further, an information display method of a mobile communication terminal, according to another aspect of the present invention, is characterized in that first information indicative of a condition of the mobile communication terminal, and also second information containing at least one of character information and image information are displayed on a display in a first display mode; the second information is displayed on the display in a full screen size in a second display mode; and the first information is notified by employing the notification unit when the present display mode is switched to the second display mode.

Also, the information display method of the mobile communication terminal is characterized in that a notification mode in which the first information is notified by employing the notification unit is selectively set under a call waiting state. While the notification mode is set, the first information is notified by employing the notification unit in the case that the present display mode is switched to the second display mode.

Further, the information display method of the mobile communication terminal is characterized in that the notification mode in which the first information is notified by employing the notification unit is set under such a condition that the present display mode is switched to the second display mode, and the first information is notified by employing the notification unit in response to setting of the notification mode.

Moreover, the information display method of the mobile communication terminal is characterized in that a judgment is made as to whether the present state corresponds to an idle state or a telephone communication state. In the case that the present display mode is switched to the second display mode under the telephone communication state, the first information is notified by employing the notification unit.

DETAILED DESCRIPTION OF THE PRESENT INVENTION

The present invention will be described with reference to the accompanying drawings for both a mobile communication terminal and an information display method of the mobile communication terminal.

Figure 1:
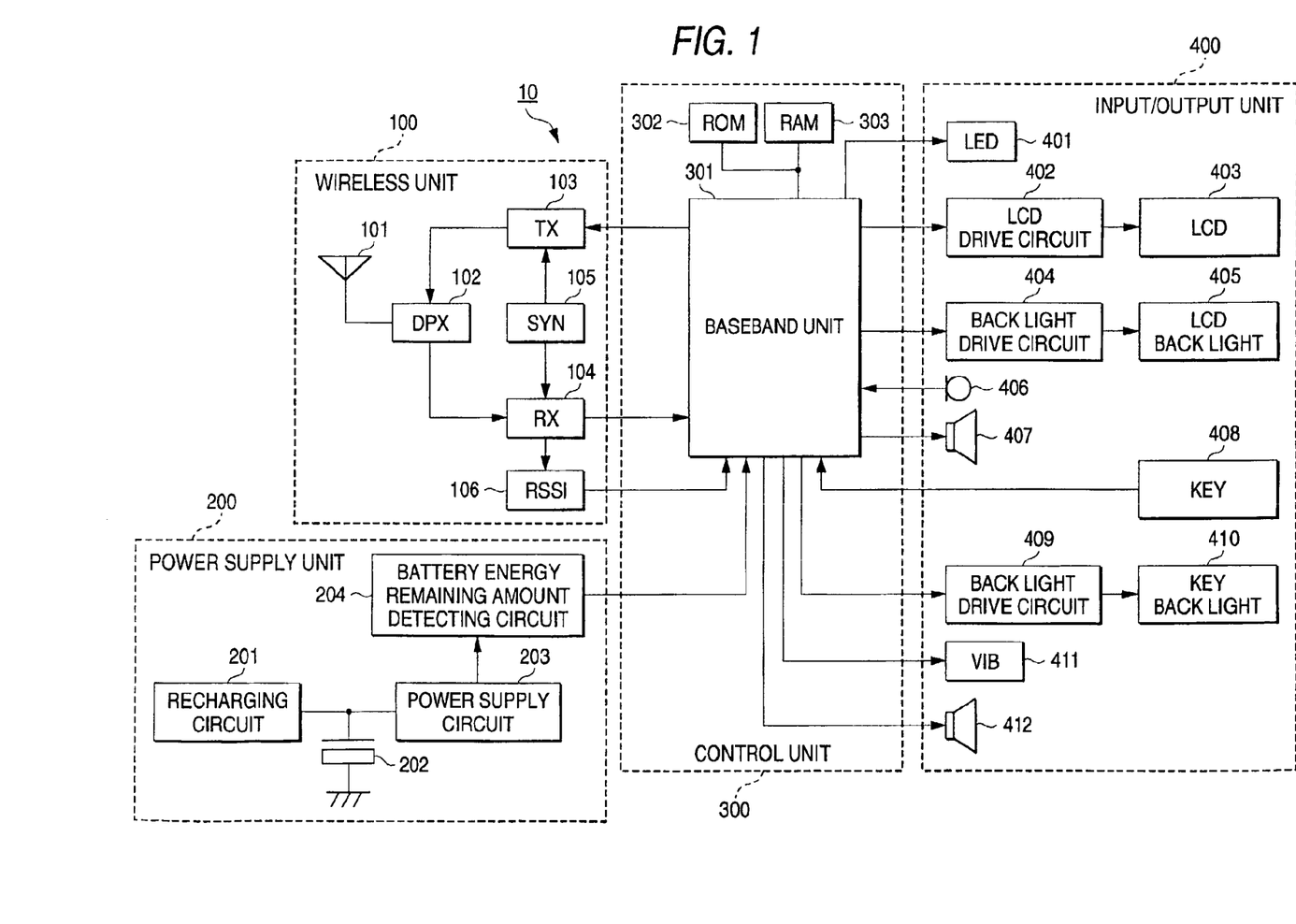
FIG. 1 is a system structural diagram for schematically showing an arrangement of a mobile communication terminal of the present invention.

FIG. 1 is a system structural diagram for schematically indicating an arrangement of a mobile communication terminal of the present invention. A mobile communication terminal 10 comprises a wireless unit 100, a power supply unit 200, a control unit 300, and an input/output unit 400.

In the mobile communication terminal, the wireless unit 100 comprises an antenna 101, a duplexer (DPX) 102, a transmission unit (TX) 103, a reception unit (RX) 104, a synthesizer (SYN) 105, and an electric field strength detecting unit (RSSI) 106. The antenna 101 receives incoming electromagnetic waves and also transmits electromagnetic waves. The duplexer (DPX) 102 switches a wireless transmission signal and a wireless reception signal. The transmission unit (TX) 103 performs a transmission process operation of a transmission signal. The reception unit (RX) 104 executes a reception process operation of a reception signal. The synthesizer (SYN) 105 switches a channel of a transmission signal and a channel of a reception signal. Also, the electric field strength detecting unit (RSSI) 106 detects an electric field strength from a reception signal received by the reception unit 104.

The power supply unit 200 comprises a recharging circuit 201, a battery 202, a power supply circuit 203, and a battery energy remaining amount detecting circuit 204. The battery 202 is recharged via the recharging circuit 201. The power supply circuit 203 supplies electric power to the respective units of the mobile communication terminal 10 by using a battery output of the battery 202. The battery energy remaining amount detecting circuit 204 detects a battery energy remaining amount of the battery 202 based upon the power output of the power supply circuit 203.

The control unit 300 comprises a baseband unit 301, a read-only memory (ROM) 302, and a random access memory (RAM) 303. The baseband unit 301 executes a process operation of a baseband signal, and controls various sorts of operations of the mobile communication terminal 10. The ROM 302 stores a control program of various operations of the mobile communication terminal 10. The RAM 303 stores various sorts of information used to control the mobile communication terminal 10.

The input/output unit 400 comprises a light-emitting diode (LED) 401 for notifying a message reception, an LCD drive circuit 402 for driving a liquid crystal display device (LCD) 403, a liquid crystal display device (LCD) 403, a back light drive circuit 404 for driving a back light (LCD back light) 405 of the liquid crystal display device (LCD) 403, and an LCD back light 405. The input/output unit 400 includes a microphone 406 functioning as a telephone transmitter, a speaker 407 functioning as a telephone receiver, a key unit (KEY) 408 on which various sorts of keys containing a dial key are arranged, a back light drive circuit 409 for driving a back light (KEY back light) 410 of the key unit (KEY) 408, a KEY back light 410, a vibrator (VIB) 411 for notifying a message reception, and also a sounder 412 for notifying a message reception.

In the mobile communication terminal of one embodiment, under a normal condition, both first information and second information are displayed on the liquid crystal display device 403 in such a manner that the first information and the second information are displayed on sub-divided display areas which are preset on the entire display screen of the liquid crystal display device 403. The first information indicates an electric field strength and a battery energy remaining amount. The second information represents other telephone numbers, a character message, and an illustration figure. Under such a condition that an indication of the first information (hereinafter "pictorial indication") is removed and the screen display mode is switched to a full-screen display mode, when the notification mode is selectively set by operating the key unit 408 so as to notify the first information, this first information is notified by way of any one of the light-emitting diode 401 for notifying the message reception, the LCD back light 405, the KEY back light 401, and the vibrator 411.

It should be noted that in the mobile communication terminal 10, in order to realize the above-explained functions, the light-emitting diode 401 for notifying the reception message is constructed in such a manner that three different colors of "green", "orange", and "red" can be selectably switched. Also, both the LCD back light 405 and the KEY back light 410 are similarly arranged in such a manner that three different colors of "green", "orange", and "red" can be selectably switched.

Figure 2A:
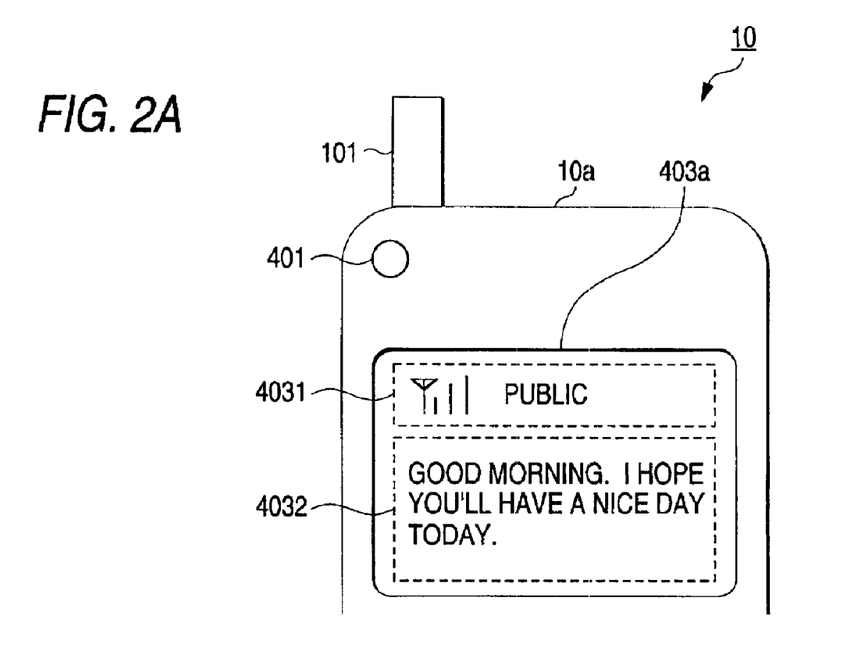
FIGS. 2A and 2B are explanatory diagrams for explaining an example of an information display operation executed in the mobile communication terminal shown in FIG. 1.
Figure 2B:
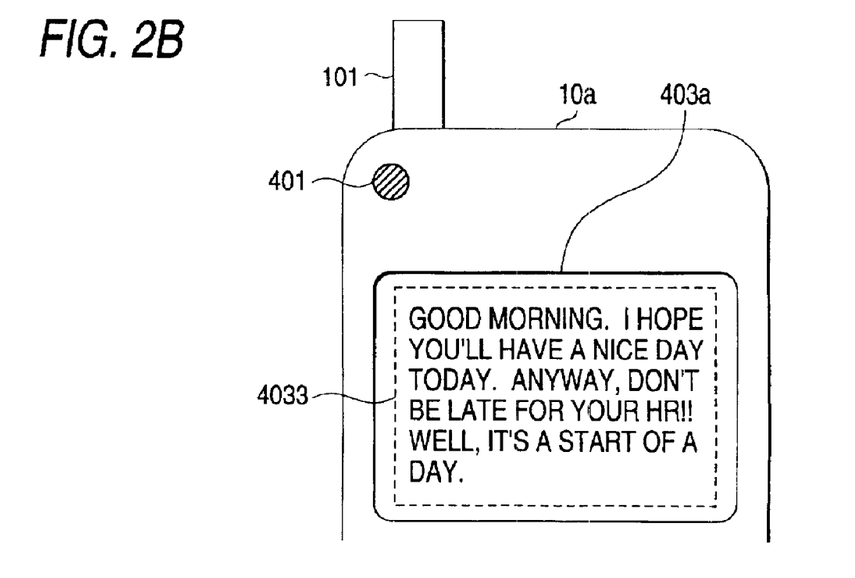

FIGS. 2A and 2B are explanatory diagrams for explaining one example of the information indicating operation by the mobile communication terminal 10, shown in FIG. 1. A display screen 403a of the liquid crystal display device 403 and the light-emitting diode 401 for notifying the message notification are arranged on a front surface of an apparatus main body 10a of the mobile communication terminal 10.

In FIG. 2A, both an indication "public" indicative of a public mode and an indication "antenna" representative of an electric field strength are pictorially displayed on an upper portion 4031 of the display screen 403a of the liquid crystal display device 403. Reception mail information is displayed in a character form on a lower portion 4032 of the display screen 403a of the liquid crystal display device 403.

When the full-screen indication of the reception mail information displayed on the lower portion 4032 of the display screen 403a shown in FIG. 2A is selected by the user manipulating the key unit 408, the display content of the display screen 403a of the liquid crystal display device 403 is made as follows. As shown in FIG. 2B, while the pictorial indication displayed on the upper portion 4031 of the display screen 403a is removed, the reception mail information which has been displayed on the lower portion 4032 of the display screen 403a is displayed on the entire area 4033 of the display screen 403a.

It should be noted that in FIGS. 2A and 2B, in order to increase a total number of displayed characters on the entire screen, the font sizes of the character information are changed in accordance with the normal indication and the full-screen indication. Alternatively, the font sizes may not be changed.

On the other hand, under the display condition of FIG. 2B since the pictorial indication which has been displayed on the upper portion 4031 of the display screen 403a shown in FIG. 2A is removed and therefore disappears, the user cannot see, for instance, the condition of the electric field strength.

As a consequence, in accordance with one embodiment, the removed electric field strength is displayed by using the light-emitting diode 401 for notifying the message reception which is not used under this condition.

Figure 3:
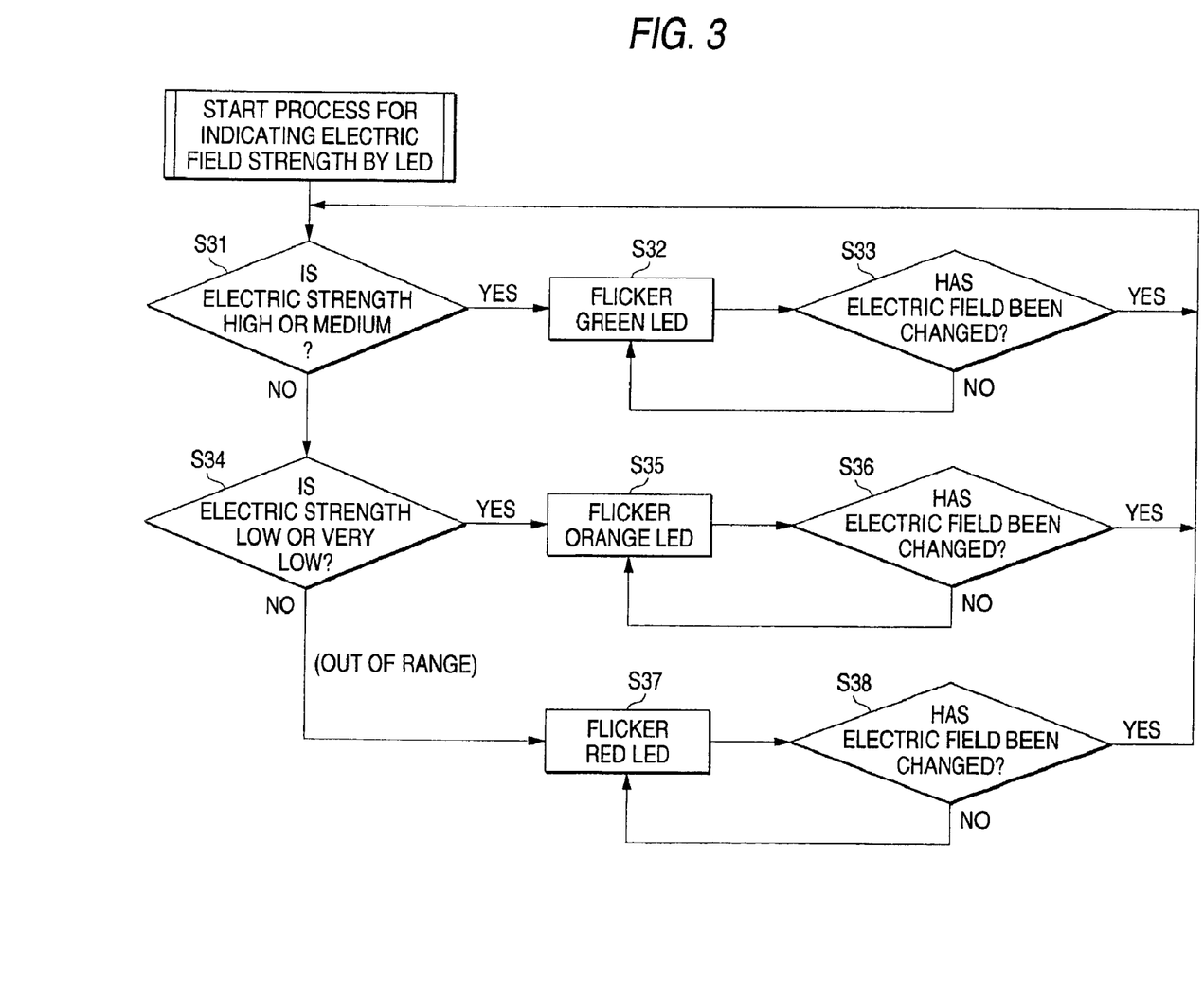
FIG. 3 is a state transition diagram for indicating a display control example of an electric field strength by a light-emitting diode for notifying a message reception shown in FIGS. 2A and 2B.

FIG. 3 is a state transition diagram for indicating a display control example of an electric field strength by using the light-emitting diode 401 for notifying the message reception shown in FIGS. 2A and 2B.

As previously explained, in the mobile communication terminal 10 of the embodiment, the light-emitting diode 401 for notifying the message reception (message reception LED) is constituted in such a manner that the three different colors of "green", "orange", and "red" can be selectively switched.

Therefore, in the embodiment, when the electric field strength is either "high" or "medium", the electric field strength is indicated by flickering the "green" color of the message reception LED 401. When the electric field strength is either "low" or "very low", the electric field strength is indicated by flickering the "orange" color of the message reception LED 401. When the electric field strength is "out of range", the electric field strength is indicated by flickering the "red" color of the message reception LED 401. It should be noted that the above-explained control operation is carried out by the baseband processing unit 301 of the control unit 300 based upon the detection output of the electric field strength detecting unit 106 of the wireless unit 100 shown in FIG. 1.

In other words, in the state transition diagram of FIG. 3, the baseband processing unit 301 firstly checks whether the electric field strength is "high" or "medium" based upon the detection output of the electric field strength detecting unit 106 (state S31). At this time, when the electric field strength is equal to either "high" or "medium" ("YES" at state S31), the baseband processing unit 301 controls the message reception LED 401 to be driven in the flicker mode of "green" color (state S32).

Next, the baseband processing unit 301 checks whether or not the electric field strength has changed (state S33). When the electric field strength has not changed ("NO" in state S33), the display control operation is returned to the state S32 at which the message reception LED 401 is continuously flickered in the "green" color. When the baseband processing unit 301 judges that the electric field strength has changed ("YES" at state S33), the display control operation is returned to the state S31.

When the baseband processing unit 301 judges at the state S31 that the electric field strength is not "high", or "medium" ("NO" at state S31), the baseband processing unit 301 checks whether the electric field strength is "low", or "very low" (state S34). When the electric field strength is equal to "low", or "very low" ("YES" at state S34), the baseband processing unit 301 controls the message reception LED 401 to be flickered in the "orange" color (state S35).

Next, the baseband processing unit 301 checks whether or not the electric field strength has changed (state S36). When the electric field strength has not changed ("NO" in state S36), the display control operation is returned to the state S35 at which the message reception LED 401 is continuously flickered in the "orange" color. When the baseband processing unit 301 judges that the electric field strength has changed ("YES" at state S36), the display control operation is returned to the state S31.

When the baseband processing unit 301 judges at the state S34 that the electric field strength is not "low", or "very low" ("NO" at state S34), the baseband processing unit 301 judges that the electric field strength is "out of range", and then the baseband processing unit 301 controls the message reception LED 401 to be flickered in the "red" color (state S37).

Next, the baseband processing unit 301 checks whether or not the electric field strength has changed (state S38). When the electric field strength has not changed ("NO" in state S38), the display control operation is returned to the state S37 at which the message reception LED 401 is continuously flickered in the "red" color. When the baseband processing unit 301 judges that the electric field strength has changed ("YES" at state S38), the display control operation is returned to the state S31.

It should also be noted that in the arrangement of FIG. 3, the electric field strengths are subdivided into three stages, namely "high" or "medium"; "low" or "very low"; and "out of range", and further, these three-staged electric field strengths are indicated by the flicker operations of "green", "orange", and "red" colors of the message reception LED 401. Alternatively, in such a case that a total number of light-emitting colors of the message reception LED 401 is larger than, or equal to 4 colors, the electric field strength may be subdivided into four stages, or more stages for color displays.

Also, in the case that the message reception LED 401 is a light-emitting diode of a single light-emitting color, the electric field strength may be indicated based upon either a flickering period or a flickering pattern of the single color light-emitting diode. Alternatively, the electric field strength may be indicated based upon an arbitrary mode, for example, a combination of a turn-ON color, a flickering period, or a flickering pattern.

The above-described indication of the electric field strength may be carried out not only by the message reception LED 401, but also by switching the light-emitting colors, or the turn-ON modes of either the LCD back light 405 or the KEY back light 410. Furthermore, the indication of the electric field strength may be carried out by changing the vibration modes of the vibrator 411.

Also, the above-described electric field strength may be displayed or notified by employing not only the above-explained stage indications, but also by notifying ON/OFF warning indications.

In the mobile communication terminal 10 according to the embodiment, in such a case that the pictorial indication of the display screen 403a of the liquid crystal display device 403 is removed and then the present display mode is switched to the full-screen display mode, a decision as to whether the electric field strength corresponding to the removed pictorial indication is displayed by the message reception LED 401 (this mode will be referred to as an "LED turn-ON mode" hereinafter), or is not displayed by the message reception LED 401 (this mode will be referred to as an "LED turn-OFF mode" hereinafter) can be made by the user setting the key unit 408 (namely, LED mode setting change).

Figure 4:
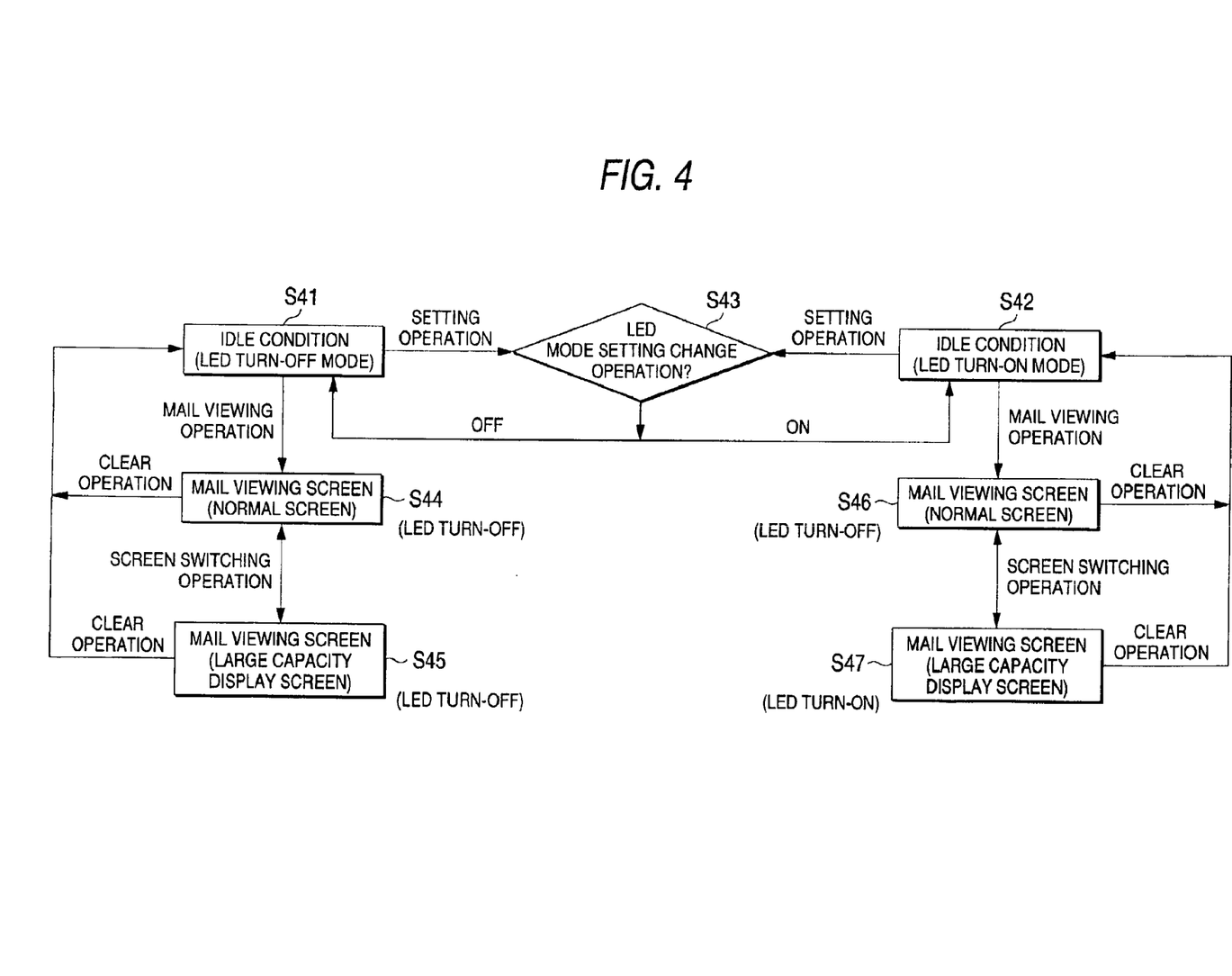
FIG. 4 is a state transition diagram for representing one example of state transition that occurs when an LED mode setting operation is changed in the mobile communication terminal shown in FIG. 1.

FIG. 4 is a state transition diagram representing a state transition example in the case that the LED mode setting operation of the mobile communication terminal 10 is changed.

In FIG. 4, the LED mode setting operation is changed under idle condition of the mobile communication terminal 10. In other words, under such an idle condition that the operation mode of the mobile communication terminal 10 is set to the LED turn-OFF mode (state S41), when the setting operation is performed by the user manipulating the key unit 408, the process operation is advanced to an LED mode setting change operation (state S43). At this state, when the baseband processing unit 301 judges that the LED mode setting change operation is turned OFF ("OFF" at state S43), the process operation is returned to the idle condition S41. When the baseband processing unit 301 judges that the LED mode setting change operation is turned ON ("ON" at state S43), the process operation is advanced to such an idle condition S42 that the operation mode is set to the LED turn-ON mode.

Also, under such an idle condition that the operation mode of the mobile communication terminal 10 is set to the LED turn-ON mode (state S42), when the setting operation is performed by the user manipulating the key unit 408, the process operation is advanced to an LED mode setting change operation (state S43). At this state, when the baseband processing unit 301 judges that the LED mode setting change operation is turned ON ("ON" at state S43), the process operation is returned to the state S42 under which the operation mode is set to the LED turn-ON mode. To the contrary, when the baseband processing unit 301 judges that the LED mode setting change operation is turned OFF ("OFF" at state S43), the process operation is advanced to such an idle condition S41 that the operation mode is set to the LED turn-OFF mode.

Then, when a mail viewing operation is performed by the key unit 408 under such an idle condition that the operation mode is set to the LED turn-OFF mode (state S41), the process operation is advanced to a display condition for a mail viewing screen of the normal screen (see FIG. 2A) (state S44). At this state, when the screen size switching operation for the full-size screen display is carried out, the present display condition is advanced to a display condition of a large capacity display screen (see FIG. 2B) (state S45). It should be understood that since the operation mode is set to the LED turn-OFF mode under this condition, the message reception LED 401 remains OFF. It should also be noted that when the user performs the clear operation at the states S44 and S45, the process operation is returned to the state S41.

When a mail viewing operation is performed by the key unit 408 under such an idle condition that the operation mode is set to the LED turn-ON mode (state S42), the process operation is advanced to a display condition for a mail viewing screen of the normal screen (see FIG. 2A) (state S46). At this state, when the screen size switching operation for the full-size screen display is carried out, the present display condition is advanced to such a display condition of a large capacity display screen (see FIG. 2B) (state S47). It should be understood that since the operation mode is set to the LED turn-ON mode under this condition, the message reception LED 401 is turned ON, so that the electric field strength is displayed. It should also be noted that when the user performs the clear operation at the states S46 and S47, the process operation is returned to the state S42.

Figure 5:
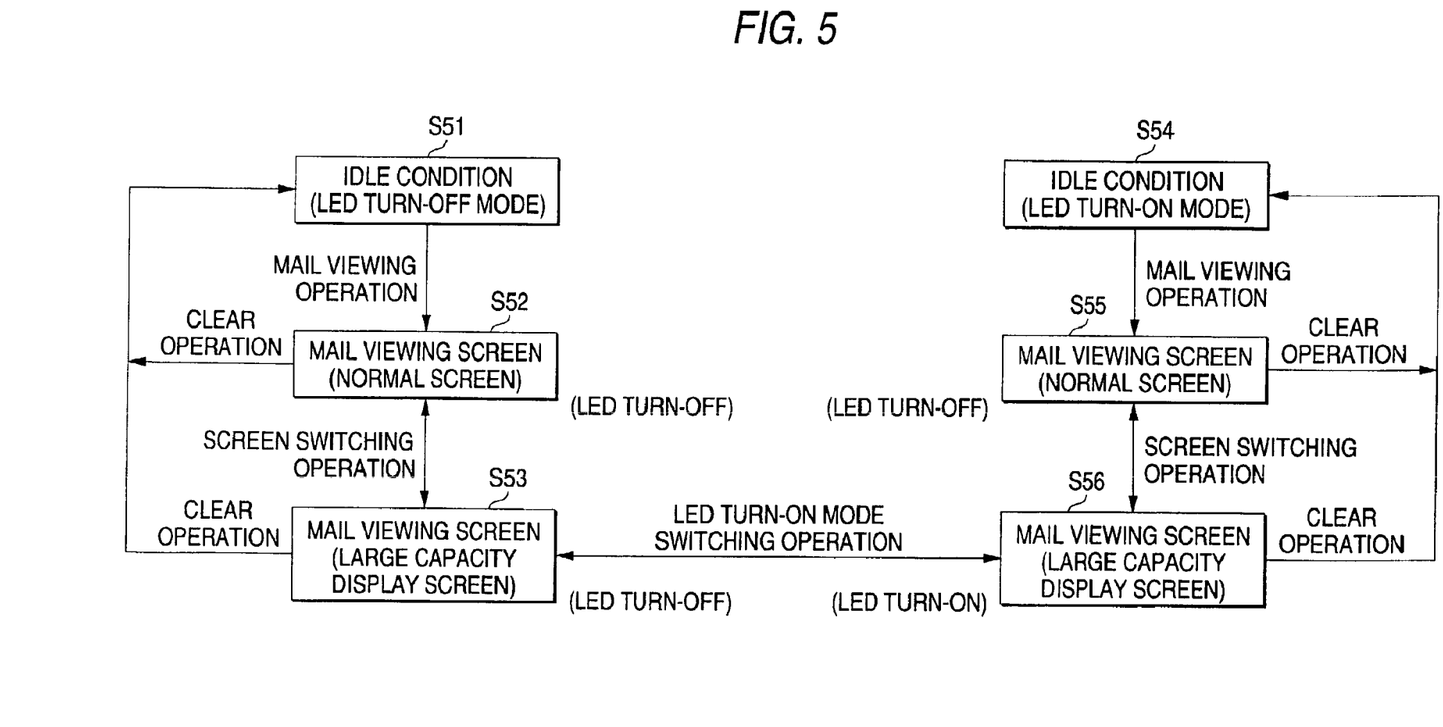
FIG. 5 is a state transition diagram for representing another example of state transition that occurs when an LED mode setting operation is changed in the mobile communication terminal shown in FIG. 1.

FIG. 5 is a state transition diagram representing another example of a state transition performed when the LED mode setting change operation is carried out in the mobile communication terminal 10.

In FIG. 5, the LED mode setting operation is changed under the large capacity display screen indication condition of the mobile communication terminal 10. In other words, when a mail viewing operation is performed by the key unit 408 under such an idle condition that the operation mode of the mobile communication terminal 10 is set to the LED turn-OFF mode (state S51), the process operation is advanced to a display condition for a mail viewing screen of the normal screen (see FIG. 2A) (state S52). At this state, when the screen size switching operation for the full-size screen display is carried out, the present display condition is advanced to such a display condition of a large capacity display screen (see FIG. 2B) (state S53). It should be understood that since the operation mode is set to the LED turn-Off mode under this condition, the message reception LED 401 remains OFF.

At this time, when the LED turn-ON mode switching operation is carried out by the user manipulating the key unit 408, the process operation is advanced to a state S56 at which the message reception LED 401 is turned ON, so that the electric field strength is indicated.

When a mail viewing operation is performed by the key unit 408 under such an idle condition that the operation mode is set to the LED turn-ON mode (state S54), the process operation is advanced to a display condition for a mail viewing screen of the normal screen (see FIG. 2A) (state S55). At this state, when the screen size switching operation for the full-size screen display is carried out, the present display condition is advanced to such a display condition of a large capacity display screen (see FIG. 2B) (state S56). It should be understood that since the operation mode is set to the LED turn-ON mode under this condition, the message reception LED 401 is turned-ON. As a result, the electric field strength is indicated.

Also, in the case that the LED turn-ON mode switching operation is carried out by manipulating the key unit 408 by the user at the state S56, the process operation is advanced to a further state S53. At this state S53, the message reception LED 401 is turned OFF, and the electric field strength is not indicated by this message reception LED 401.

Figure 6:
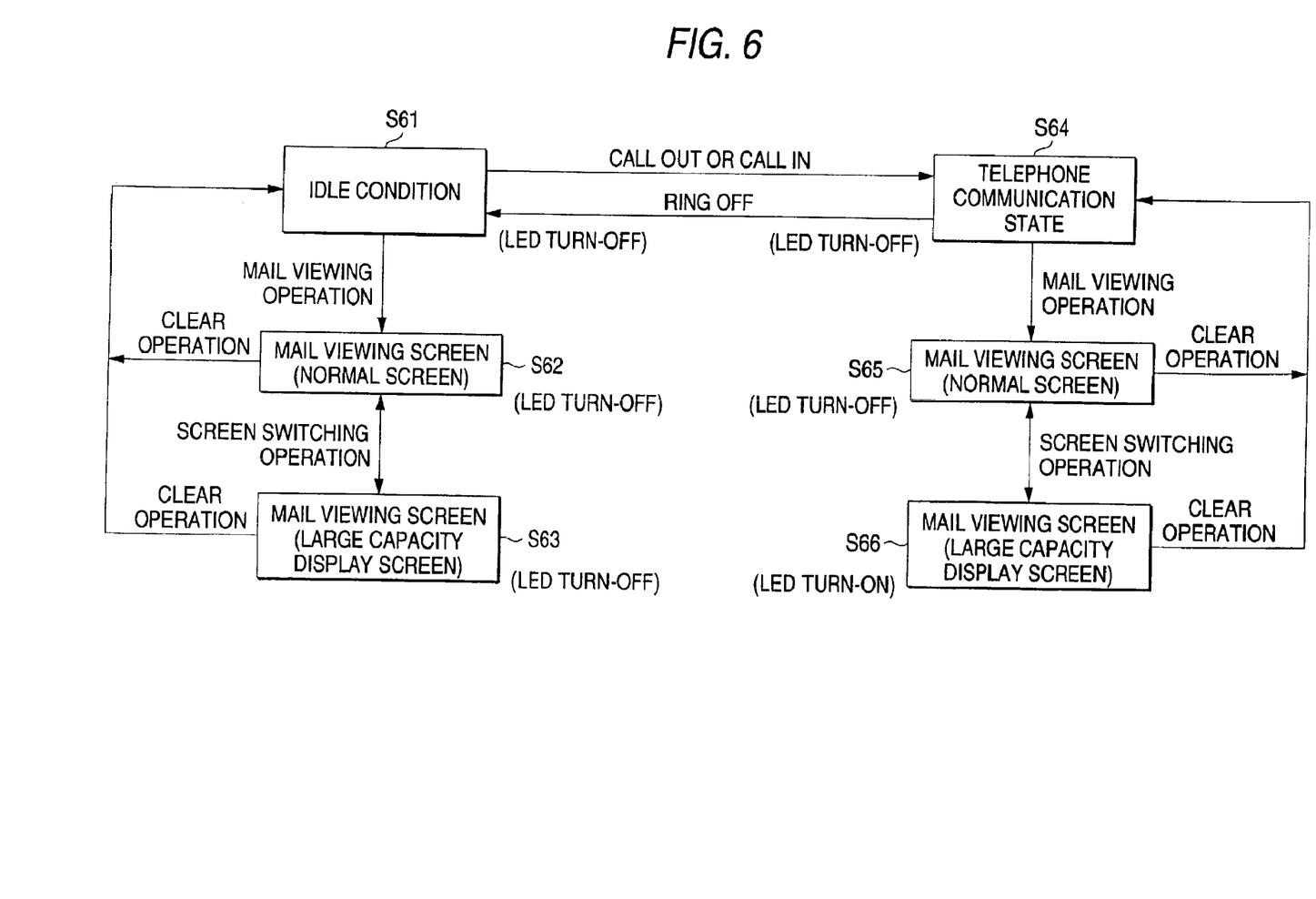
FIG. 6 is a state transition diagram for representing another example of state transition that occurs when an LED mode setting operation is changed in the mobile communication terminal shown in FIG. 1.

FIG. 6 is a state transition diagram for indicating a further example of an LED turn-ON condition in the mobile communication terminal 10 according to the embodiment.

In FIG. 6, in the case that the mobile communication terminal 10 views a mail from an idle condition (off-line mode), even when the screen display mode is switched to the large capacity screen, no indication is made of the electric field strength by the LED. However, in the case that the mobile communication terminal 10 views a mail under telephone communication condition (on-line mode), when the screen display mode is switched to the large capacity screen, the electric field strength is indicated by the LED.

Alternatively, the mobile communication terminal 10 may be arranged in such a large capacity display mode that the battery energy remaining amount is indicated by the LED in the off-line mode, whereas the electric field strength is displayed only in the on-line mode.

In other words, when a mail viewing operation is executed by the key unit 408 under such a condition that the mobile communication terminal 10 is brought into a waiting state (state S61), the process operation is advanced to a display condition for a mail viewing screen (see FIG. 2A) of the normal screen (state S62). At this state, when the screen size switching operation for the full-size screen display is carried out, the present display condition is advanced to such a display condition of a large capacity display screen (see FIG. 2B) (state S63). It should be understood that since the operation mode is set to the LED turn-OFF mode under this condition, the message reception LED 401 remains OFF.

Also, when a mail viewing operation is executed by the key unit 408 under such a condition that the mobile communication terminal 10 is brought into a telephone communication state (state S64), the process operation is advanced to a display condition for a mail viewing screen (see FIG. 2A) of the normal screen (state S65). At this state, when the screen size switching operation for the full-size screen display is carried out, the present display condition is advanced to such a display condition of a large capacity display screen (see FIG. 2B) (state S66). It should be understood that since the operation mode is set to the LED turn-ON mode under this condition, the message reception LED 401 is turned ON, so that the electric field strength is indicated.

It should also be noted that when the pictorial indication of the display screen 403*a* of the liquid crystal display device 403 is removed and then the screen display mode is switched to the full-screen display in FIG. 4 to FIG. 6, the electric field strength is indicated by the message reception LED 401 corresponding to the notification unit, and this electric field strength is equal to the first information corresponding to the removed pictorial indication. Alternatively, even when the first information corresponds to, for example, the battery energy remaining amount, the mobile communication terminal may be constituted in a similar manner. Also, even when the notification unit corresponds to another notification unit, for example, the LCD back light 405, the KEY back light 410, or the vibrator 411, the mobile communication terminal may be arranged in a similar manner.

In the above explanation, the first information is one sort of information. Alternatively, when a plurality of notification units are combined with each other, a plurality of information may be notified. For instance, the mobile communication terminal 10 may be constituted in such a way that the battery energy remaining amount is indicated by the color of the LCD back light 405, and the electric field strength is indicated by the color of the KEY back light 410.

Also, even when one sort of notification units is employed, a plurality of information may be notified by combining display modes thereof and/or notification modes thereof with each other.

Figure 7:
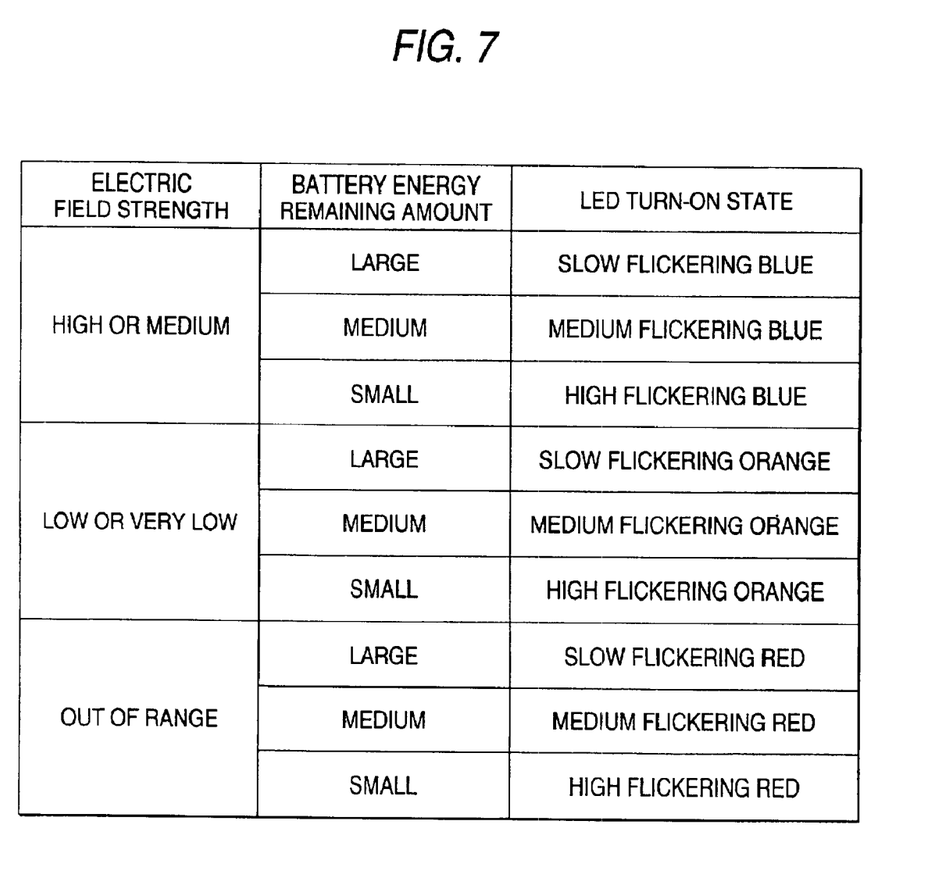
FIG. 7 is an explanatory diagram for explaining an example of turn-ON modes of a message reception LED in the case that both an electric field strength and a battery energy remaining amount are displayed by employing the message reception LED of the mobile communication terminal shown in FIG. 1.

FIG. 7 is an explanatory diagram for explaining an example of turn-ON modes of the message reception LED 401 in the case that both an electric field strength and a battery energy remaining amount are indicated by the message reception LED 401.

FIG. 7 shows such an explanatory diagram that the message reception LED 401 is applied to such a light-emitting diode capable of emitting three color light, namely "green", "orange", and "red" color light. An electric field strength is indicated in three stages by employing three color light "green", "orange", and "red" of the message reception LED 401, whereas a battery energy remaining amount is indicated by a flickering period of this message reception LED 401.

In other words, as shown in FIG. 7, for example, in such a case that the electric field strength is either "high" or "medium", and the battery energy remaining amount is "large", the message reception LED 401 indicates this condition in the indication manner of "slow flickering" operation in "green" color.

Also, in such a case that the electric field strength is either "low" or "very low", and the battery energy remaining amount is "medium", the message reception LED 401 indicates this condition in the indication manner of "medium speed flickering" operation in "orange" color.

Also, in such a case that the electric field strength is "out of range", and the battery energy remaining amount is "small", the message reception LED 401 indicates this condition in the indication manner of "fast flickering" operation in "red" color.

When the mobile communication terminal is arranged in the above-described manner, both the electric field strength and the battery energy remaining amount can be indicated by employing a single set of such a message reception LED 401.

It should be understood that the present invention is not limited to the above-explained various structures of the embodiment, but may be modified, changed, and substituted without depending from the technical scope and spirit of the present invention.

As previously described in detail, even under such a condition that the pictorial indication is removed and the screen display mode is switched to the full-screen display mode, since the necessary information related to the pictorial indication can be notified, there are such merits that both the communication reliability and the operability of the mobile communication terminal can be improved. Further, the mobile communication terminal having such a superior information notification function and information display method thereof can be provided.

What is claimed is:

1. A mobile communication terminal comprising:
    a display device for displaying information in at least one of character format and image format, the display device being switchable between a first display mode and a second display mode;
        the first display mode displaying first and second information, the first information indicating a condition of the mobile communication terminal and the second information being different from the first information,
        the second display mode displaying only the second information in a full screen size; and
    a notification unit for presenting the first information using neither character format nor image format; and
    a notification unit controller for controlling the notification unit to present the first information when the display device is switched to the second display mode.

2. The mobile communication terminal as claimed in claim 1, wherein:
    the first information contains at least one of an electric field strength and a battery energy remaining amount.

3. The mobile communication terminal as claimed in claim 1, wherein:
    the notification unit is a light-emitting diode for notifying a call reception; and
    the notification unit controller controls the notification unit to present the first information based on a turn-ON condition of the light-emitting diode.

4. The mobile communication terminal as claimed in claim 3, wherein:
    the notification unit controller controls the notification unit to present the first information by a turn-ON color or turn-ON period of the light-emitting diode, or a combination of the turn-ON color and the turn-ON period of the light-emitting diode.

5. The mobile communication terminal as claimed in claim 1, wherein:
    the notification unit is a back light of the display device; and
    the notification unit controller controls the notification unit to present the first information using a turn-ON color of the back light.

6. The mobile communication terminal as claimed in claim 1, wherein:
    the notification unit is a back light of an operation key; and the notification unit controller controls the notification unit to present the first information using a turn-ON color of the back light.

7. The mobile communication terminal as claimed in claim 1, wherein:
the notification unit is a vibrator for notifying a call reception; and
the notification unit controller controls the vibrator to present the first information by a vibration mode of the vibrator.

8. The mobile communication terminal as claimed in claim 1, wherein:
the notification unit comprises at least two notification units; and
the notification unit controller controls the two notification units to present the first information by combining notification modes of the two notification units.

9. The mobile communication terminal as claimed in claim 1, wherein:
the notification unit controller comprises a setting section for selectively setting a notification mode in which the notification unit presents the first information when the present display mode is switched to the second display mode; and
when the notification mode is set by the setting section, the notification unit controller controls the notification unit to present the first information under such a condition that the display device is switched to the second display mode.

10. The mobile communication terminal as claimed in claim 9, wherein:
the setting section sets the notification mode under an idle state; and
the notification unit controller controls the notification unit to present the first information when the display device is switched to the second display mode.

11. The mobile communication terminal as claimed in claim 9, wherein:
the setting section sets the notification mode when the display device is switched to the second display mode; and
the notification unit presents the first information in response to the notification mode set by the setting section.

12. The mobile communication terminal as claimed in claim 1, wherein:
the notification unit controller comprises a judging section for judging whether a present state corresponds to an idle state or a telephone communication state; and
when the judging sections judges that the present state corresponds to the telephone communication state, the notification unit controller controls the notification unit to present the first information when the display device is switched to the second display mode.

13. An information display method of a mobile communication terminal having a display device for displaying information in at least one of character format and image format, the display device being switchable between a first display mode and a second display mode; the first display mode displaying first and second information, the first information indicating a condition of the mobile communication terminal and the second information being different from the first information, and the second display mode displaying only the second information in a full screen size; the information display method comprising:

switching the display device to the second display mode; and
presenting the first information by an notification unit using neither character format nor image format.

14. The information display method as claimed in claim 13, wherein:
the first information corresponds to information containing at least one of an electric field strength and a battery energy remaining amount; and
the second information corresponds to information containing at least character information and image information.

15. The information display method as claimed in claim 13, wherein:
the notification unit comprises at least two notification units; and
the two notification units present the first information by combining notification modes of the at least two notification units.

16. The information display method as claimed in claim 13, further comprising:
selectively setting, under an idle state, a notification mode in which the first information is presented by the notification unit; and
presenting the first information by the notification unit when the display device is switched to the second display mode, while the notification mode is set.

17. The information display method as claimed in claim 13, further comprising:
setting a notification mode in which the first information is presented by the notification unit, when the display device is switched to the second display mode; and
presenting the first information by the notification unit in response to the setting of the notification mode.

18. The information display method as claimed in claim 13 further comprising:
judging whether a present state corresponds to an idle state or a telephone communication state; and
presenting the first information by the notification unit when the display device is switched to the second display mode under the telephone communication state.

19. A mobile communication terminal comprising:
a display device for displaying information in at least one of character format and image format, the display device being switchable between a first and a second display mode;
the first display mode displaying first information indicating a condition of the mobile communication terminal in a first area of the display screen; and displaying second information, different from the first information, in a second area of the display screen that is different from the first area,
the second display mode displaying the second information in a third area comprising the first and second areas; and
a notification unit for presenting the first information; and
a notification unit controller for controlling the notification unit to present the first information when the display device is switched to the second display mode.

20. An information display method of a mobile communication terminal having a display device for displaying information in at least one of character format and image format, the display device being switchable between a first and a second display mode; the first display mode displaying first information indicating a condition of the mobile communication terminal in a first area of the display screen and displaying second information, different from the first information, in a second area of the display screen that is different from the first area, and the second display mode displaying the second information in a third area comprising the first and second areas; the information display method comprising:

switching the display device to the second display mode; and presenting the first information by a notification unit.

* * * * *